United States Patent [19]

Sachetto et al.

[11] 4,357,467

[45] Nov. 2, 1982

[54] DEPOLYMERIZED CELLULOSIC MATERIAL WITH LOW CRYSTALLINITY OBTAINED FROM CELLULOSIC FIBERS AND PROCESS FOR ITS MANUFACTURE

[75] Inventors: Jean-Pierre Sachetto, St-Julien en Genevois; Jean-Pierre Michel, Ferney-Voltaire, both of France; Sergio Cuccolo, Geneva, Switzerland; Alain Regnault, Ferney-Voltaire, France

[73] Assignee: Battelle Memorial Institute, Columbus, Ohio

[21] Appl. No.: 196,042

[22] PCT Filed: Oct. 23, 1979

[86] PCT No.: PCT/CH79/00138

§ 371 Date: Jun. 20, 1980

§ 102(e) Date: Jun. 20, 1980

[87] PCT Pub. No.: WO80/00843

PCT Pub. Date: May 1, 1980

[30] Foreign Application Priority Data

Oct. 24, 1978 [CH] Switzerland ............... 10963/78

[51] Int. Cl.³ ............................................. C08G 18/08
[52] U.S. Cl. .................................... 536/56; 424/362; 426/658; 536/57
[58] Field of Search ....................................... 536/56, 57

[56] References Cited

U.S. PATENT DOCUMENTS

| | | | |
|---|---|---|---|
| 2,305,833 | 12/1942 | Warth | 536/56 |
| 2,978,446 | 4/1961 | Battista et al. | 536/56 |
| 3,278,519 | 10/1966 | Battista et al. | 536/56 |
| 3,345,357 | 10/1967 | Cruz | 536/56 |
| 3,397,198 | 8/1968 | Greidinger et al. | 536/57 |
| 3,954,727 | 5/1976 | Toshkov et al. | 536/57 |
| 4,058,411 | 11/1977 | Bellamy et al. | 435/232 |

FOREIGN PATENT DOCUMENTS

482727 9/1929 Fed. Rep. of Germany.
748428 7/1933 France.

OTHER PUBLICATIONS

Sharkov, V. I. et al., Chemical Abstracts, 1972, 76, (No. 16), 87379w.

Primary Examiner—A. Lionel Clingman
Attorney, Agent, or Firm—Finnegan, Henderson, Farabow, Garrett & Dunner

[57] ABSTRACT

Depolymerized cellulose powder having substantially an amorphous structure which is obtained by letting cellulose fibers dissolve in concentrated hydrochloric acid of about 40% and at a temperature of at least 38° C. A homogeneous acid hydrolysis is carried out under well controlled conditions in order to depolymerize the dissolved cellulose and is stopped when the cellulose has achieved a mean degree of polymerization between 10 and 200. The depolymerized dissolved cellulose is then separated and processed in order to obtain the aforesaid powder of amorphous depolymerized cellulose.

14 Claims, 6 Drawing Figures

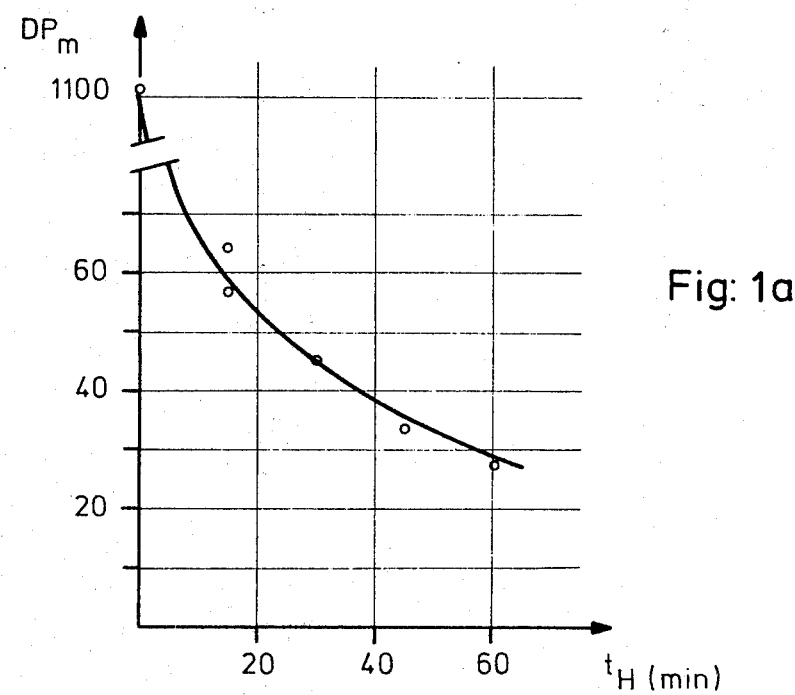
Fig: 1a
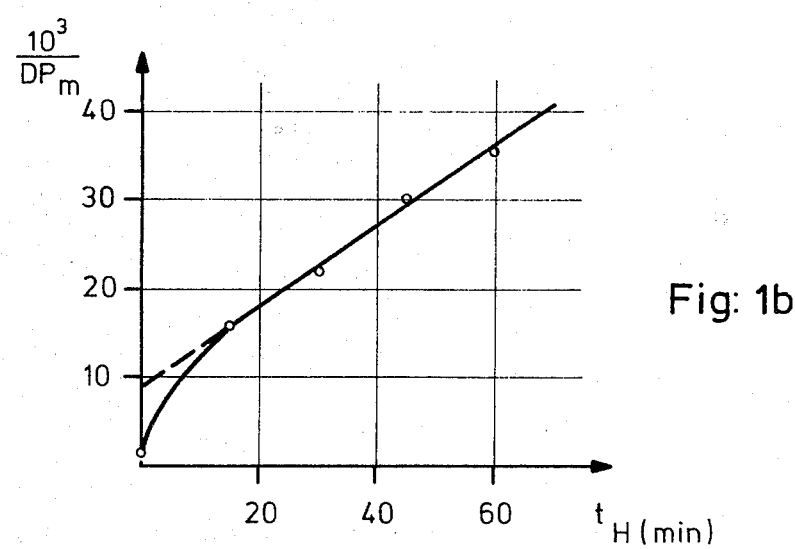
Fig: 1b

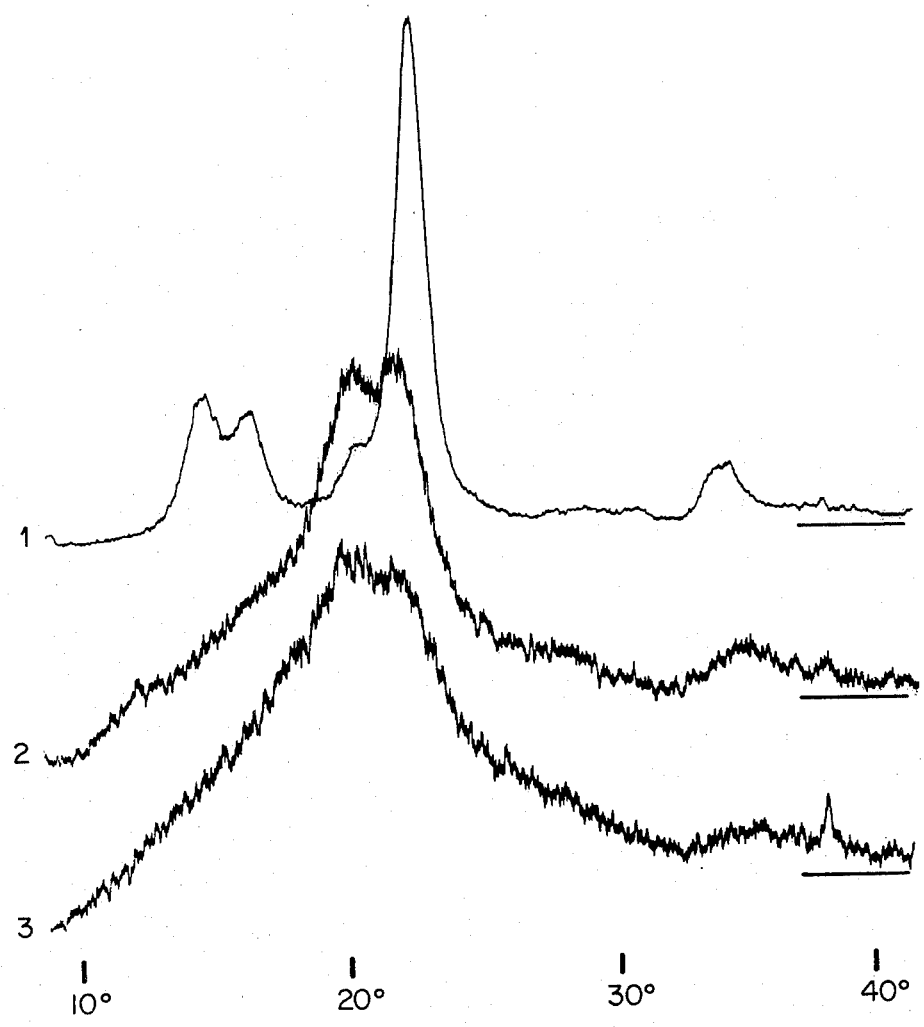
Fig: 2

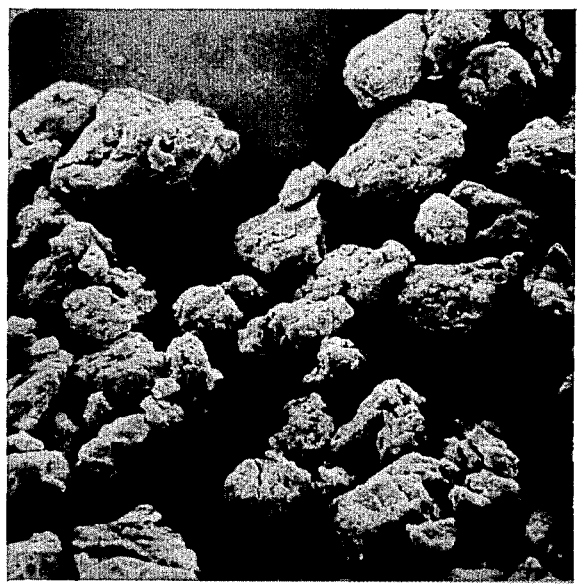
Fig: 3
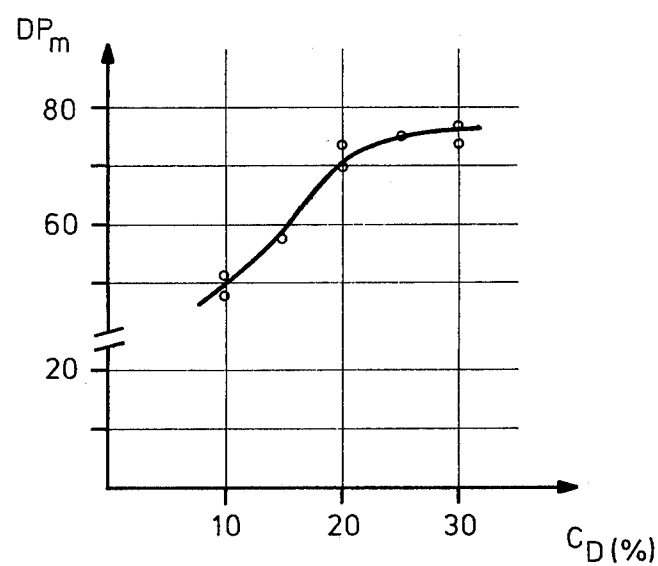
Fig: 4

DEPOLYMERIZED CELLULOSIC MATERIAL WITH LOW CRYSTALLINITY OBTAINED FROM CELLULOSIC FIBERS AND PROCESS FOR ITS MANUFACTURE

TECHNICAL FIELD

The present invention concerns a depolymerized cellulose powder and, as a matter of consequence, the controlled depolymerization of cellulose and, namely, its conversion into a depolymerized cellulose powder with a high degree of amorphicity.

Microcrystalline cellulose is known which is obained from a combination of chemical and physical treatments. Thus, the amorphous portions of cellulose are preferentially hydrolyzed by diluted acids; then, the undissolved crystalline portions thereof are recovered and disintegrated mechanically. The product from this heterogeneous acid hydrolysis is a depolymerized cellulose which has a "limited degree of polymerization" ("level-off degree of polymerization" or "DP-cellulose"). This product is thereafter milled and dried such as to obtain a finely ground powder of microcrystalline depolymerized cellulose.

THE PRIOR-ART

The prior-art relative to micro-crystalline cellulose can be illustrated by the following publications:
U.S. Pat. No. 2,978,446;
An article entitled: "Microcrystalline Cellulose" published in Industrial & Engineering Chemistry 5 (9), 20–29, September (1962).
An article entitled "Microcrystalline Cellulose Powders, Properties and Possible Application in Nutrition" published in the Tappi review 61 (5), May (1978).

The particles of the microcrystalline cellulose powder obtained as disclosed have lost the initial fibrous structure of cellulose, however, there was noted that they nevertheless have an acicular microcrystalline structure which can be undesirable for some applications, namely in the field of food chemistry, because such crystalline cellulose can possibly cause damages to the body cells.

However, these known processes for fabricating microcrystalline cellulose are not capable to achieve a controlled depolymerization, the latter intendedly reaching well determined polymerization degrees, which degrees would be below the limits obtainable from heterogeneous acid hydrolysis.

Other references concerning the depolymerization of cellulose can be cited, e.g.:

East German Patent No. DD No. 91.974 discloses the treatment of cellulose with gaseous HCl below 40° C. without any solvent, which provides a product suitable for manufacturing mycrocrystalline cellulose.

East German Patent No. DD 71.282 discloses a process for hydrolyzing cellulose fibers down to about 150 $\mu$m sizes, after which this product is ground in an air-jet mill, which provides particles of 5–20 $\mu$m and a degree of polymerization (DP) of about 180. It is however not mentioned that such a cellulose is amorphous.

Geman Patent DAS No. 1.470.825 discloses the preparation of cellulose microcrystallites by the hydrolysis of amorphous portions of cellulosic fibers, then grinding in the presence of water and freeze-drying of the aqueous suspension thus obtained.

Geman Patent DAS No. 1.123.460 discloses the hydrolysis of cellulosic materials, namely viscose, by means of boiling in 2.5 N HCl. The product thus obtained is washed, neutralized and ground in the presence of water, so as to obtain a suspension of cellulose microparticles of 0.5–1 $\mu$m.

Austrian Pat. No. 288.805 concerns a method rather similar with that mentioned above, as does U.S. Pat. No. 2,978,446. The following Chemical Abstract publication can be further cited: CA 66, 9991w (1967); CA 66, 77156a (1967); CA 67, 118346d (1967); CA 72, 123397p (1970); CA 73, 51582 (1970); CA 73, 67850c (1970); CA 82, 87960c (1975); CA 83, 130305c (1975) and CA 84, 6765j (1976).

Other references exist in which cellulose is fully dissolved in a concentrated acid and the dissolved product is thereafter separated and isolated by precipitation. Thus, $\phi$. ELLEFSEN et al. disclose in Norsk Skog Industri 1959, p. 411, the dissolving of cellulose at 20° C. in aqueous 38–40.3% HCl and, after variable periods, the reprecipitation of the dissolved cellulose by adding water. This publication indicates that the products obtained were crystalline and not amorphous.

French Pat. No. 471.479 discloses dissolving cellulose in aqueous HCl of concentration above 39% and the precipitation of the dissolved product (by water or other solvents) into cellulosic products. It is however not indicated in this reference that the obtained products are made of amorphous cellulose.

British Pat. No. 476.191 discloses treating cellulose with concentrated hydrofluoric acid and its conversion into hydro-soluble products whereas Swiss Patent 79 809 discloses dissociating cellulose in mixtures of HCl (25–35%) and sulfuric or phosphoric acids at temperature below 50° C. These references do not indicate however that the cellulosic products obtained be amorphous.

U.S. Pat. No. 4,058,411 is also known which describes a process for decrystallizing cellulose by means of concentrated phosphoric acid, in order to favor the further conversion of said uncrystallized cellulose into glucose by acid hydrolysis. However, this process does not provide for the production of a depolymerized cellulose powder, substantially amorphous, and having a controlled degree of polymerization.

The object of the present invention is to provide a depolymerized cellulose constituted from a poly-(1-4)-anhydroglucose having a controlled degree of polymerization and of amorphicity.

DESCRIPTION OF THE INVENTION

The cellulose material of the invention is characterized by the fact that its degree of crystallinity does not exceed 70% and its polymerization degree is from about 10 to 200 units of anhydroglucose. This material presents itself under the form of a powder which can be used as such or which can still be improved and homogenized by mechanical grinding.

The particles of this powder have a globular shape with blunt angles as shown on the annexed drawing (see FIG. 5) and they are not acicular as microcrystalline cellulose usually is. The particles can have many variable dimensions but a preferred scale of distribution comprises particles of the order of 50 to 100 $\mu$m. The density of the powder, at the moisture level of 2 to 5%, is about 0.3 to 0.7 kg/l, this density being that of the free flowing powder, not in the compressed state.

The process of the invention which enables obtainment of the above-mentioned powder is characterized by the fact that:

(a) the cellulose fibers are dissolved in a concentrated aqueous acid at a temperature of at least 30° C. and the solution is kept in this condition for a period of 15 to 60 min. such that said fibers undergo a depolymerization process through homogeneous hydrolysis, then (b) the acid hydrolysis is discontinued and part or all the depolymerized product is separated from the acid in which it is dissolved by diluting said acid and consecutive precipitation of the fraction that is insoluble in the diluted acid, or by a fast evaporation of the hydrolyzing solution.

Due to the dissolving of cellulose in concentrated acid according to the present invention, the crystalline portions, as well as the amorphous portions, are simultaneously dissolved and can thus be subjected to a homogeneous hydrolysis in the concentrated acid. This homogeneous acid hydrolysis of the cellulose as a whole is thus effected in the liquid phase, within the concentrated acid medium containing the dissolved cellulose, which thus enables the depolymerization of the cellulose to proceed under well controlled conditions, i.e. selectively, and to discontinue said homogeneous acid hydrolysis when the degree of polymerization of the depolymerized dissolved cellulose has reached a magnitude which can be of any desired low value, depending on the depolymerized product to be manufactured in each case. Such a homogeneous acid hydrolysis essentially depends on the acid concentration, the temperature and the reaction time, all such being parameters which can be easily and accurately controlled for ensuring a selective depolymerization of cellulose. The course of the homogeneous acid hydrolysis can be easily and accurately controlled by viscometric measurement for determining the average polymerization degree of the dissolved cellulose during the depolymerization thereof.

It thus becomes possible, thanks to such selective depolymerization by means of a well controlled homogeneous acid hydrolysis of cellulose, to fabricate a rather large range of depolymerized products with a reduced degree of polymerization, this being predetermined and between 10 and 200.

When the desired depolymerization has been effected, a substantially amorphous cellulose powder is collected from the liquid reaction medium comprising the depolymerized cellulose dissolved in the concentrated acid medium.

BEST ROUTES TO ACHIEVE THE INVENTION

It is advantageously possible to stop said controlled homogeneous hydrolysis by cooling the concentrated acid medium containing the dissolved depolymerized cellulose, for example to a temperature between 0° and 10° C. This cooling operation is however not essential and the hydrolysis can be interrupted by diluting the acid or by any other means for separating the dissolved product from the solvent. When dilution is undertaken, then there is total or partial precipitation of the depolymerized cellulose depending on the extent of dilution of the mixture. The precipitate is then separated, for instance, by draining or centrifuging the separated precipitate is then dried.

It should be pointed out, in this respect, that the solution which is obtained after some given time of hydrolysis consists of a mixture of various depolymerized cellulose fractions the solubility of which, in the diluted acid, depends on the level of depolymerization. In other words, if the hydrolysis medium is progressively diluted, e.g. with water, the higher molecular weight fractions precipitate first then, with further successive dilutions, the other fractions of progressively decreasing molecular weight will precipitate in turn, the lower molecular weight fractions being collected last.

Moreover, the less soluble the portions of depolymerized cellulose, the higher their crystallinity level. Consequently, the more the cellulose is depolymerized, the more it is amorphous, which finding is a surprisingly element in the present invention and an unpredictable one regarding the general state of the prior-art (see for instance the article by φ. ELLEFSEN mentioned hereinabove). According to ELLEFSEN the amorphous state is mostly found in the celluloses having been ground mechanically, and such amorphous cellulose reverts to the crystalline state after dissolving in an acid and reprecipitation.

It should however be noted that a recent reference exists, U.S. Pat. No. 3,397,198 (GREIDINGER et al.), which discloses a partially depolymerized cellulose consisting of extremely fine particles (colloidal sizes) of a totally amorphous structure. According to said reference, this product is obtained by dissolving cellulose in a considerable excess (10:1) of 70-75% sulfuric acid at 35°-45° C. and allowing hydrolysis to proceed for a very short period (2-3 min), which time is however accurately controlled, then by interrupting the reaction by diluting with a large volume of water and, thereafter separating the precipitated solid by filtration. The DP of this product is not given but it is mentioned as being lower than that of known microcrystalline degraded celluloses. This product and this method clearly distinguish from that of the invention, namely regarding the following points: the product of the reference is completely amorphous whereas the degree of amorphicity of the product of the invention is not over 83% (17% of crystallinity). The particles of the product of the invention have a size of, preferentially, 50 to 100 μm (visible with the naked eye) whereas that of the product of the reference have colloidal dimensions. The DP of the product of the reference seems to be lower than that of the product of the invention, now however, the reference says that it is insoluble in water whereas, in the invention, the depolymerized cellulose may reach about 20% solubility in water. The acid used in the method of the reference is highly concentrated and the reaction times are very short, which makes the reaction conditions difficult to control. In the invention, by using more diluted acids, namely HCl which is volatile, a better control of the reaction time is achieved and, moreover, HCl can be removed by evaporation (spray drying) which does not seem feasible in the case of the reference. Finally, in the case of the invention, the evaporated HCl can be recovered and easily recycled which makes the process particularly economical and non-polluting.

For precipitating by dilution, the depolymerized cellulose of the invention, any appropriate precipitation means can be used, e.g. the addition of a non-solvent which can advantageously be water, but which can also be methanol, ethanol or acetone. It is however understood that any other adequate precipitating agent or adequate means for effecting a solid/liquid separation of the depolymerized cellulose can be used.

By means of precipitation experiments also carried out within the scope of the invention, it has been shown that a good recovery of precipitated depolymerized cellulose can be achieved by diluting the hydrochloric acid down to 10–30%, said hydrochloric acid having been used for carrying out said controlled homogeneous hydrolysis.

It is also possible to achieve, if needed, a fractionated precipitation of the depolymerized cellulose by successive dilutions of the said acid medium, and to separate from this medium the respective depolymerized cellulose fractions having different DP's comprised between 10 and 200. The depolymerized cellulose thus precipitated in the acid medium can thereafter be separated by decanting, draining, filtration or centrifugation, or, if required, by any other appropriate method for solid/liquid separation. The precipitated and separated material will finally be dried, preferably by subjecting it to spray-drying. It is also possible to directly dry the hydrolyzing solution by spray-drying, the HCl thus eliminated being recoverable and recyclable. Such a precipitation followed by separating and drying as described hereinabove enables obtainment of a powder product with a final moisture content near 5% and a mesh size of about 50–100 $\mu$m.

In place of said spray-drying which leads to instantaneous evaporation (flash-evaporation), it is also possible to perform a slow evaporation drying under low pressure and at a temperature not over 40° C. for avoiding possible crystallization. In this case, it is further possible to reduce, if necessary, the mesh size of the dried product by grinding mechanically.

The dissolved depolymerized cellulose can also be directly recovered by stabilizing under cooling the liquid reaction mixture which results from said controlled acid hydrolysis and by subjecting it, thereafter, to spray-drying which causes the flash-evaporation of the concentrated acid medium. Thus, the substantially amorphous depolymerized cellulose is recovered in the form of a very finely divided powder. Its degree of polymerization is then generally comprised between 30 and 100 and its solubility in water can reach as much as 20%. The physico-chemical properties of the depolymerized celluloses obtained according to the present invention can be determined as follows:

the intrinsic viscosity of the depolymerized product can be determined after dissolving in copper-ethylenediamine solution: CUEM process, standard DIN 54270 (1977) and the average polymerization degree, in a well known manner, from the intrinsic viscosity thus measured. The anhydroglucose content of the depolymerized cellulose can be determined by an enzyme reaction with glucose oxidase after full hydrolysis of said depolymerized cellulose into glucose. This content is directly related to the effective cellulose content of the starting material (purity of the cellulosic product). The degree of amorphicity can be determined by X-ray spectrography as will be seen hereinafter. The surface condition of the obtained powder can be visualized by looking through the scanning electron-microscope. The yield of overall conversion is determined gravimetrically and is expressed as the percent of the treated cellulose dry weight.

The raw material used for embodying the invention is generally rich in $\alpha$-cellulose (>95%). It can consist of a native cellulose under the form of a purified (bleached) pulp or of cotton linters; otherwise it can consist of regenerated cellulose in the form of viscose fibers. It is also possible to contemplate using a cellulose raw material of lower purity such as unbleached or recovered wooden pulp.

The controlled acid hydrolysis depolymerization of cellulose such as that according to the invention can be advantageously carried out in 37–42% concentrated hydrochloric acid which is a very effective solvent for cellulose. This ensures the wetting and the rapid dissolving of cellulose and, simultaneously, the hydrolysis of the glucoside links of the crystalline lattice as well as of the amorphous regions of the cellulosic fibers, i.e. it enables achieving a homogeneous acid hydrolysis of cellulose.

The conversion yield and the quality (degree of polymerization and of amorphicity) of the depolymerized celluloses produced according to the invention can depend, on a certain extent, on the type of cellulose used as raw material and on the treating conditions purposely selected in each case as will be seen hereinafter. Acid hydrolysis experiments effected within the scope of the present invention have shown that excellent results can be obtained when the concentrated hydrochloric acid depolymerization is carried out in the following conditions intervals.

Concentration of HCl acid: 37 to 42%
Hydrolysis temperature: 30° to 50° C.
Hydrolysis period: 15 to 60 min
weight ratio: HCl solution/Cellulose: 4 to 10

It is however understood that also other concentrated acid media can be contemplated to effect said controlled acid hydrolysis, e.g. concentrated 37–72% sulfuric acid or mixtures of the recited acids. Also, the use of a certain number of organic solvents can be contemplated, such as dimethylsulfoxide (DMSO) and dimethylformamide (DMF), in order to assist in the dissolving of cellulose in concentrated acid.

The average polymerization degree of the depolymerized cellulose produced according to the present invention can be adjusted in a rather precise manner by means of at least one of the following parameters of the process according to the invention:

the duration ($t_H$) of the hydrolysis, i.e. the time of contact of the cellulose with the acid medium.
the temperature of the acid medium.
the concentration of the acid medium.

SUGGESTIONS OF INDUSTRIAL APPLICATIONS

The Examples that follow illustrate the carrying out of the present invention for the understanding of which the annexed drawing is used as a reference.

FIGS. 1a and 1b are diagrams which illustrate the variation of the DP and its reciprocal as a function of hydrolysis time according to the experimental results of Example 2.

FIG. 2 represents X-ray diffraction spectra from two powders obtained according to Example 2 as well as from one starting cellulosic material.

FIG. 3 shows an enlarged picture ($\times 500$), obtained with the scanning electron-microscope (stereoscan type) of an amorphous depolymerized cellulose powder such as obtained in Example 2.

FIG. 4 illustrates the variation of the average polymerization degree ($DP_m$) of depolymerized cellulose after precipitation by the addition of water to the hydrolysis solution as a function of the final concentration, after dilution, of the acid.

EXAMPLE 1

Figure 5:
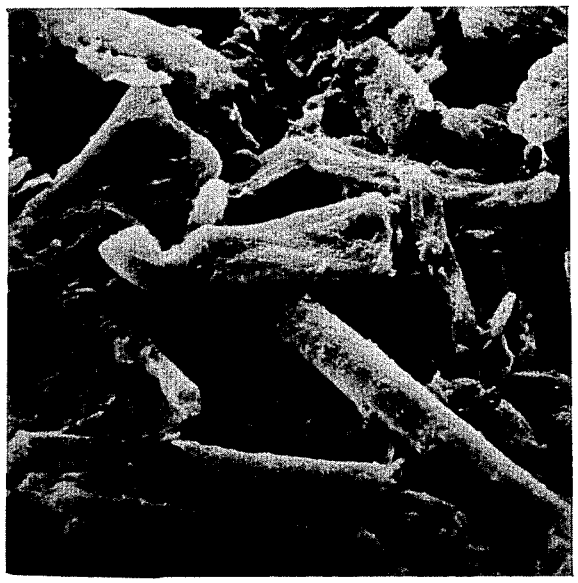
FIG. 5 shows, as a matter of comparison, an enlarged image of a powder of microcrystalline cellulose of the prior-art.

There was used, as a starting cellulose material, a bleached and ground wooden pulp of type "Rauma C" (average degree of polymerization $DM_{mo} = 1140$; degree of crystallinity 95%, water content 5%). One hundred g of this wooden pulp was dissolved in one liter of 40% concentrated hydrochloric acid and the whole was agitated at 30° C. for 15 min. There was then added to the liquid reaction medium a sufficient amount of ice for diluting the HCl, and reducing its concentration from 40% to 20%, thus causing the depolymerized cellulose to precipitate. The precipitated depolymerized product was thereafter separated by centrifugation after which it was washed with water, to remove all traces of HCl, and then it was dried in air at 40° C. for reducing its water content down to about 5%.

There was thus obtained 67 g of depolymerized cellulose powder (5% moisture). Finally, said depolymerized cellulose was ground in a grinder so as to impart to it an average mesh size of 50 um.

The product thus obtained was subjected to various analyses and the following parameters were determined:

The average polymerization degree $DP_m$, by measuring its intrinsic viscosity according to standard DIN No 54270, found $DP_m = 68$.

The amorphicity level A, by the method of L. SEGAL et al in Textile Res. Journal, Oct. 1959, pages 786–794; found $A = 60\%$.

COMPARATIVE EXPERIMENT

A second sample of 100 g of wooden pulp was subjected to hydrolysis as described above by means of 37% concentrated HCl (instead of 40%). After 15 min at 30° C., the cellulose of the pulp was not completely dissolved. After recovery of the product, as described above, there was obtained 90 g of depolymerized cellulose which, on analysis, gave the following values: $DP_m = 190$; $A = 10–20\%$.

This shows that the use of an acid with less than 40% concentration does not lead to the desired result.

EXAMPLE 2

Four samples, 1 to 4, of 100 g of pulp "Rauma C" were subjected to a 40% HCl hydrolysis at 30° C. as described in Example 1. The hydrolysis time was varied for each sample, i.e. 15, 30, 45 and 60 min, respectively.

Then, the depolymerized product was precipitated by diluting the reaction mixture until the level of HCl was 15%. The precipitated product was then separated, washed, dried in air at 40° C., ground and analyzed as described in the previous Example. The results obtained are collected in the Table below and illustrated by FIGS. 1a, 1b, 2 and 3.

TABLE I

Effect of hydrolysis time on the DP and the degree of crystallinity.

| Sample | hydrolysis time (min) | yield % | DP | Degree of amorphicity % | Degree of crystallinity % |
|---|---|---|---|---|---|
| 1 | 15 | 75 | 57 | 55 | 45 |
| 2 | 30 | 55 | 45 | 55 | 45 |
| 3 | 45 | 45 | 34 | 70 | 30 |
| 4 | 60 | 25 | 27 | 83 | 17 |

FIG. 1a illustrates the variation, as a function of the hydrolysis time $t_H$, of the average polymerization degree $DP_m$ of the depolymerization product obtained. FIG. 1b shows that the variation of the reciprocal of the average degree of polymerization with time becomes substantially linear after an initial period of about 15 min during which the hydrolysis is very fast.

FIG. 2 (X-ray diffraction spectra) illustrates the amorphicity of the powder obtained after periods $t_H = 15$ min (curve 2) and $t_H = 30$ min (curve 3), respectively; by way of comparison, the spectrum of a native cellulose "Rauma C" (curve 1) indicates the existence of a high level of crystallinity.

FIG. 3 is a magnified view ($\times 500$), obtained with an electron-microscope, of the cellulose powder depolymerized according to the invention, of which the particles have a substantially globular shape without sharp angles.

As a matter of comparison, FIG. 5 represents a microcrystalline cellulose the particles of which have an acicular shape (magnification 500 $\times$). There was effected, for the 15 min hydrolysis time sample, a measure of the polymerization degree distribution around the mean value $DP_m = 57$. The fractionating method used was that of R. L. MITCHELL in "Industrial & Engineering Chemistry 45, (11), 2526 (1953); it gave the following distribution:

| DP | Percent of the sample |
|---|---|
| 15–30 | 11 |
| 30–50 | 13 |
| 50–60 | 56 |
| 60–80 | 13 |
| 80–90 | 7 |

These results show that the degree of polymerization of at least half (in weight) of the depolymerized cellulose obtained corresponds effectively to the mean value $DP_m$.

The curve of $1/DP_m$ represented on FIG. 1b can be interpreted as follows:

(i) between $t_H = 0$ and 15 min (the time necessary for the pulp to completely dissolve) two reaction rates are superimposed:

a very fast hydrolysis of the amorphous portions of the cellulose with a sharp drop of the $DP_m$, a slower hydrolysis of the crystalline portions of the cellulose.

(ii) Beyond $t_H = 15$ min, there is a homogeneous acid hydrolysis which more closely corresponds to the depolymerization of the dissolved crystalline portions and in which the value of $1/DP_m$ increases with $t_H$ and follows a linear relation of the type below:

$$\frac{10^3}{DP_m} = b + at_H$$

in which b is a certain value of mean polymerization degree obtained by linearly extrapolating to time $t_H=0$.

$DP_m$ is the mean polymerization degree at the time $t_H$; a is a constant which corresponds to the protons activity and depends on the temperature and the initial acid concentration. This concentration $C_H$ can be between 37 and 42%, temperature T between 30° and 40° C., and the total hydrolysis duration $t_H$ between 15 and 60 minutes.

The above relationship characterizes a homogeneous degradation of the dissolved cellulose macro-molecule, this being independent of the initial crystalline state of the raw material.

It is also understood that the homogeneous acid hydrolysis can be extended further to achieve a depolymerization for attaining still lower values of the $DP_m$, down to 10 for example.

EXAMPLE 3

Five samples (5 to 9) of 40 g of the same starting material described in Example 1 were treated for 15 min. at 40° C. with 400 ml of 40% HCl according to the description of Example 1.

Then, as previously described, the depolymerized product was made to precipitate by adding quantities of water different from sample to sample in order that the final HCl concentration $C_D$ after dilution be different in each sample. This final concentration $C_D$ was, for samples 5 to 9, of 10, 15, 20, 25 and 30%, respectively. There was noted then that the quantity of precipitated substance was different for each case, the weight of recovered powder being the reciprocal of the concentration $C_D$. The product precipitate was finally separated, washed, dried, ground and analyzed as described in the previous Examples.

FIG. 4 shows the variation of the average degree of polymerization $DP_m$ of the depolymerized product obtained as a function of the precipitation concentration $C_D$ of the diluted HCl acid. It is seen that the amorphicity level is a function of the $DP_m$. It becomes apparent, from this Example, that when the hydrolysis solution is progressively diluted by successive quantities of water, the cellulose fractions with the higher $DP_m$ are first to precipitate, the fractions with lower $DP_m$'s precipitating only after further dilution of the solution. It is also seen that the amorphicity degree parallels the extent of depolymerization.

TABLE II

Effect of dilution of the reaction medium on the yield of depolymerized cellulose and on the $DP_m$ and the degree of crystallinity thereof.

| Sample | % HCl after dilution $C_D$ | yield | DP | Degree of amorphicity % | Degree of crystallinity % |
|---|---|---|---|---|---|
| 5 | 10 | 80 | 50 | 65 | 35 |
| 6 | 15 | 75 | 55 | 60 | 40 |
| 7 | 20 | 65 | 70 | 50 | 50 |
| 8 | 25 | 50 | 75 | 50 | 50 |
| 9 | 30 | 40 | 80 | 30 | 70 |

EXAMPLE 4

Cotton linters (1.5 kg) of 4.4% humidity and a $DP_{mo}$ or average degree of polymerization equal to 2520 and a degree of crystallinity of 92% were dry ground for obtaining a starting material which was used as follows:

twelve liters of 40% concentrated HCl were sprayed at 30° C. on said starting material (1.5 kg of cotton fibers) placed in a 30 l container subjected to a rotating motion. The fibers swell uniformly and dissolved easily. The whole was kept for 60 min at 30° C., then the mixture was cooled to 15° C. so as to stop the hydrolysis process. Then, the cold solution was filtered and said liquid medium was subjected to spray drying by means of an atomizer supplied with hot air so as to achieve an instantaneous evaporation (flash evaporation) of the acid contained in the liquid mixture. There were thus collected 1.4 kg of depolymerized cellulose powder having particles of 100 μm mesh size which was analyzed as described in Example 1 and gave the following results:

Average degree of polymerization $DP_m=71$

Degree of amorphicity $A=20-30\%$

EXAMPLE 5

1.5 kg of cotton fibers were depolymerized for 40 min at 30° C. in 12 liters of concentrated 40% HCl according to the method of the previous Examples. Then, the solution was filtered on sintered glass and the mixture was diluted with water to 20% concentration which caused the precipitation of a first crop (No 10) of depolymerized cellulose powder. This was centrifuged and dried to give 0.95 kg of a depolymerized cellulose of about 100 μm mesh size which was analyzed as described in the previous Examples and gave the following results:

Average degree of polymerization $DP_m=122$

Estimated degree of amorphicity $A=15\%$

Then the 20% HCl solution from the above centrifugation was further diluted to a $C_D$ of 7.5% which caused the precipitation of a second crop (No 11) of depolymerized cellulose which was also separated by centrifugation and similarly washed and dried. This second fraction (0.3 kg) of depolymerized cellulose powder was thus collected having a mesh size of about 100 um and the following properties:

Average degree of polymerization $DP_m=35$

Estimated degree of amorphicity $A=60\%$

EXAMPLE 6

(Fractionated precipitation of depolymerized cellulose)

A 100 g sample of starting material Rauma C was hydrolyzed for 15 min at 30° C. in 1 liter of 40% HCl. Then, the depolymerized cellulose was precipitated in four successive steps as follows:

(i) the 40% acid was first diluted to a concentration $C_D=25\%$ which caused the precipitation of a first fraction of depolymerized cellulose which was separated by centrifugation, washed, dried, and finely ground as in Example 1. There was thus collected 50 g of a depolymerized cellulose powder with a mean mesh size of 50 um (sample No 12) which was analyzed as described in Example 1. Found $DP_m=75$.

(ii) The solution at 25% of HCl resulting from the separation of the first fraction was then further diluted to a $C_D=20\%$ which then caused the precipitation of a second fraction of depolymerized cellulose (sample No 13) which was also separated by centrifugation, washed, dried and ground similarly. There was then collected 16.5 g of which the $DP_m$ was measured. Found $DP_m=55$.

(iii) The solution at 20% of HCl resulting from the second centrifugation was then further diluted to $C_D=15\%$ which precipitated a third fraction of depolymerized cellulose that was separated, still by centrifugation, washed, dried and ground. There was thus collected 8.0 g of a third fraction (sample No 14) which was analyzed similarly. Found $DP_m=25$.

(iv) The solution at 15% HCl resulting from the third centrifugation was then further diluted to $C_D=10\%$ which caused the precipitation of a last fraction of depolymerized cellulose that was separated, washed, dried, ground and analyzed as described above. Found $DP_m=12$; yield 3 g (sample No 15).

The various results are gathered in the Table below.

TABLE III

Fractionated precipitation of depolymerized cellulose

| Sample | Dilution of the hydrolysis solution conc. of HCl (%) | Isolated product (%) | DP | Level of amorphicity (%) | Level of crystallinity (%) |
|---|---|---|---|---|---|
| 12 | 40 to 25 | 50 | 75 | 50 | 50 |
| 13 | 20 to 20 | 17 | 55 | 60 | 40 |
| 14 | 20 to 15 | 8 | 25 | 80 | 20 |
| 15 | 15 to 10 | 3 | 12 | 80 | 20 |
|  | Total | 78 |  |  |  |

From the results of the above Table as well from that of the previous Examples, the following can be deduced: to ensure a high amorphicity of the obtained depolymerized product, the crystalline and amorphous parts of cellulose should be dissolved completely.

The dissolving of wooden pulp is faster than the dissolving of cotton linters. (Further, it may be interesting, economically, to use wooden pulp as a cheap starting material as compared with cotton linters).

The final drying operation should be effected under conditions, adapted, as much as possible, to avoid a possible recrystallization of the depolymerized product (rapid separation and rather low temperature).

The mean degree of polymerization $DP_m$ of the depolymerized product can be decreased by:

(i) increasing the concentration $C_H$ of the hydrolyzing acid (Example 1)

(ii) increasing the time $t_H$ of hydrolysis (Example 2) and/or (iii) diluting extensively, when effecting the separation, the hydrolysis solution (Example 3) which simultaneously ensures a good yield of recovery of the depolymerized product.

The highest values of $DP_m$ (i.e. a small degree of depolymerization), in contrast, correspond to:

a relatively lower concentration of the hydrolyzing acid a relatively short hydrolyzing time not much dilution at the end of the hydrolysis.

Consequently, the favorable conditions for obtaining a good yield of useful products, this being from case to case depending on the application, are for instance to hydrolyze wooden pulp at 30° C. for 15 to 20 min with 40% concentrated HCl and, thereafter, to dilute the acid down to a level of 15-20% for causing a practically complete precipitation of the depolymerized product.

The present invention thus furnishes a depolymerized cellulose powder which has a substantially amorphous structure, a microglobular porous aspect, and a well controlled degree of polymerization all of which ensures for this powder a combination of particularly interesting properties suitable for a wide range of industrial applications. In this regard, the following significant properties of said powder can be mentioned:

increased compatibility, as compared with a native or regenerated cellulose, with other basic products such as starches, proteins and lipids;

improved dispersivity in water which favors gel formation;

significant usefulness of the above two properties in respect to the foodstuff industry, namely in connection with the preparation of new formulations susceptible to contain as much as 25% of depolymerized cellulose; the manufacture of foodstuffs with medium moisture content (intermediate moisture foods); solving problems of texturization and improvement of organoleptic properties in the presence of proteins and sugars;

improved chemical reactivity owing to the important active, microglobular, porous surface which favors the synthesis of highly water-soluble derivatives (ether types) having well defined low viscosities and being usable in various areas of cosmetic and pharmaceutical chemistry.

EXAMPLES OF USE

EXAMPLE 7

Dietetic candy bars

A batter composition with a hazelnut taste was prepared by mixing the following ingredients:

| Ingredients | Parts by weight |
|---|---|
| Regular hazelnut paste | 15 |
| Roasted hazelnut puree | 5 |
| Soya meal | 4 |
| Lecithin | 3 |
| Sorbitol | 10 |
| Glucose Syrup (at 45° Be) | 30 |
| Fructose syrup (70% of solids) | 18 |
| Sucrose | 10 |
| Gelatin | 1 |
| Water | 4 |

To 750 g of the above composition were added 250 g of the depolymerized cellulose powder corresponding to the sample of Example 1 and the whole was subjected to extrusion in order to shape the dough into bars about 10 cm long and 15-20 mm thick. Then the bars were dipped into molten chocolate for coating with a chocolate layer.

On the other hand, control samples were prepared having the same composition but in which the cellulose was a classical commercial cellulose for use in foodstuffs.

The candy bars thus prepared were tasted by several persons who agreed to declare that the candies containing the amorphous cellulose powder according to the invention imparted more softness to the foodstuff and gave less dryness in the mouth than the commercial cellulose powder.

EXAMPLE 8

Preparation of tablets

There were mixed together in a mixer 800 g of ascorbic acid, 95 g of lactose, 5 g of magnesium stearate and 100 g of a depolymerized cellulose according to the invention having a degree of amorphicity of about 35%, a $DP_m$ of 70, a moisture content of 4% and an average mesh size of 50 to 100 μm (38% rejection on a 50 μm sieve), specific pouring volume of 1.6 cm³/g. The mixture was molded and pressed in a commercial press under a load of 55 MN/m² for obtaining tablets of about 0.4 g each. These tablets had a density of 1.3 g/cm³ and a hardness of 6.1 kg.

The depolymerized cellulose of the invention is therefore perfectly appropriate for making pharmaceutical tablets without the drawbacks of micro-crystalline celluloses for this use, namely regarding the crossing by the latter of the gastro-intestinal membrane (on this, see J. Siedermann, Zur Frage der Unbedenklichkeit bei der Verwendung von mikrokristalliner Cellulose für Kalorienreduzierte Lebensmittel: Die Nahrung 20 (5), 495 (1976).

EXAMPLE 9

Preparation of a confectionary product

There was selected a depolymerized cellulose powder according to the invention having the following properties:

Dimension: about 50 μm; amorphicity: about 35%; $DP_m$: about 120; cellulose purity: 98%; moisture content: 4–5%.

There were prepared three samples of pastes A, B and C for confectionery articles by means of the following ingredients (% by weight):

| Ingredients | A | B | C |
|---|---|---|---|
| Wheat flour | 15.4 | 11.55 | 7.7 |
| Dried corn starch | 18.0 | 13.5 | 9 |
| Yeast K (Kondar) Na Al₃H₁₄(PO₄).4H₂O | 0.5 | 0.5 | 0.5 |
| Sugar "semoule" | 36.9 | 38.9 | 38.9 |
| Hydrolysate of soya proteins | 6.7 | 6.7 | 6.7 |
| Egg white | 5.2 | 5.2 | 5.2 |
| Egg yolk | 10.3 | 10.3 | 10.3 |
| Glycerol | 5.0 | 5.0 | 5.0 |
| Depolymerized cellulose | — | 8.35 | 16.7 |

Bars of about 300 g each were made with the pastes A, B and C and were cooked for 30 min in a stove at 190° C. After cooking, the water content $H_w$ (%) of the cakes thus obtained was measured and also the "water activity" Aw (a measurement which relates to the partial pressure of the water vapor in the foodstuff), respectively. The following results were obtained:

A: 28.9%; 0.82 B: 29.0%, 0.81 C: 25.3; 0.77

This lowering of the water content and activity for the samples containing the depolymerized cellulose of the invention correlates with an improved conservation under storage. This property was evidenced as follows: samples of cakes A, B and C were artificially polluted by spraying with 0.5 ml of a liquid containing 10⁵ cells/ml of a mixture of germs, yeasts and molds; then, the cakes were wrapped in a plastic sheet and stored for two weeks at ordinary temperature. After this period, there was observed that the cakes A were strongly contaminated, the cakes B were slightly contaminated and the cakes C were untouched. Regarding the organoleptic properties of the freshly cooked cakes, no significant differences were noted between cakes A, B and C.

We claim:

1. Depolymerized cellulose material having a degree of crystallinity of at least 17% but not exceeding 70%, an average degree of polymerization $DP_m$ corresponding to 10 to 200 units of anhydroglucose and being in powdered form with a low moisture content, the particles of the powdered material being microporous and having a globular shape with rounded angles.

2. Material according to claim 1, characterized by the fact that the size of the particles of said powder are of the order of 50 to 100 μm and that at least half of its molecules have a DP equal to the $DP_m$.

3. Material according to claim 1, characterized by the fact that the density of the powder in the free state is from 0.3 to 0.7 kg/l.

4. Material according to claim 1, characterized by the fact that it is hydrophilic and compatible with starches, proteins and lipids.

5. A process for manufacturing the material of claim 1, comprising dissolving cellulosic material in concentrated aqueous hydrochloric acid at a temperature in the range of from 30° to 50° C. and maintaining the solution at this temperature for 15 to 60 minutes whereby the fibres of the material, under these conditions, depolymerize by homogeneous hydrolysis, then interrupting the hydrolysis either by dilution of the reaction medium or by cooling and separating the depolymerized cellulose material from the hydrolyzing solution.

6. Process according to claim 5, characterized by the fact that the acid is 37–42% aqueous HCl and that interrupting the hydrolysis is effected by diluting the hydrolyzing medium with water, such dilution causing a separation by precipitation of the depolymerized material.

7. Process according to claim 6, characterized by the fact that this separation is carried out by progressive dilution and fractionated precipitation, the fractions obtained, in turn, having an increasing level of depolymerization and a decreasing level of crystallinity.

8. Process according to claim 5, characterized by the fact that interrupting the hydrolysis is effected by cooling and the separation is effected by a fast evaporation of the solution.

9. Process according to claim 8, characterized by the fact that the solution is evaporated by spray drying in a heated air stream between 160° and 80° C.

10. Process according to claim 6, characterized by the fact that the precipitated product is collected by draining, filtration or centrifugation and that it is dried and ground finely so as to homogenize the dimensions of its particles.

11. Process according to claim 10, characterized by the fact that there is used for grinding a hammer mill or a ball mill.

12. The depolymerized cellulose material of any one of claims 1, 2–4 wherein the material is a dietetic foodstuff additive.

13. The depolymerized cellulose material of any one of claims 1, 2–4 wherein the material is a pharmaceutical excipient.

14. The depolymerized cellulose material of any one of claims 1, 2–4 wherein the material is a cosmetic excipient.

* * * * *